United States Patent
Cless et al.

[15] 3,641,583
[45] Feb. 8, 1972

[54] ELECTRODYNAMIC TRANSDUCER

[72] Inventors: Gerhard Cless, Skokie; Jerome L. De Boo, Barrington, both of Ill.

[73] Assignee: Teletype Corporation, Skokie, Ill.

[22] Filed: May 28, 1970

[21] Appl. No.: 41,486

[52] U.S. Cl. ...................................346/29, 178/18, 310/27, 318/35, 336/121, 340/195, 346/139 R
[51] Int. Cl. .........................................................G01d 5/20
[58] Field of Search..................346/29, 139 R; 318/35, 575, 318/686, 687, 135, 195, 38; 178/18–20, 43; 340/195, 5 R; 310/12–14, 27; 336/119–123, 125; 33/1 C, 1 PT, 1 CC

[56] References Cited

UNITED STATES PATENTS

| | | | |
|---|---|---|---|
| 1,035,568 | 8/1912 | Frazier | 178/20 |
| 2,643,933 | 6/1953 | Kinickij | 346/29 |
| 2,938,151 | 5/1960 | Bowditch | 310/27 X |
| 3,126,541 | 3/1964 | Korn et al. | 343/5 R X |

*Primary Examiner*—Joseph W. Hartary
*Attorney*—J. L. Landis and R. P. Miller

[57] ABSTRACT

An input/output assembly comprises a pair of members coupled such that a first thereof carrying an input/output element is reciprocative relative the second at each position of the second; and both members are translocatable simultaneously in a path extending transversely of the direction of reciprocation. First and second electrical induction coils, having portions which are coupled in the magnetic flux field of a permanent magnet structure, are secured to the first and second members, respectively, with the coupled portions disposed in planes having orthogonal aspects, each to the other. The second coil is circumposed about a rail which is included in the magnetic structure and is movable longitudinally thereof in response to magnetmotive forces when the transducer is adapted as a motor and in response to mechanical forces applied to the element when the transducer is adapted as a generator for generating an electrical effect therein. The displacement of the second coil results in simultaneous movement of the first coil longitudinally of said rail. The first coil is arranged in said flux field for movement transversely of said rail independently from the second coil such that the element is reciprocated when the transducer operates as a motor and an electrical effect is generated therein upon movement of the element along a vector having a velocity coordinate corresponding to the first coil when the transducer operates as a generator.

The rail may be arcuate whereby the first member is reciprocative radially, along an $r$ axis, independently of said second member with which it is simultaneously translocatable angularly, along a $\theta$ axis in a plane with the $r$ axis.

10 Claims, 7 Drawing Figures

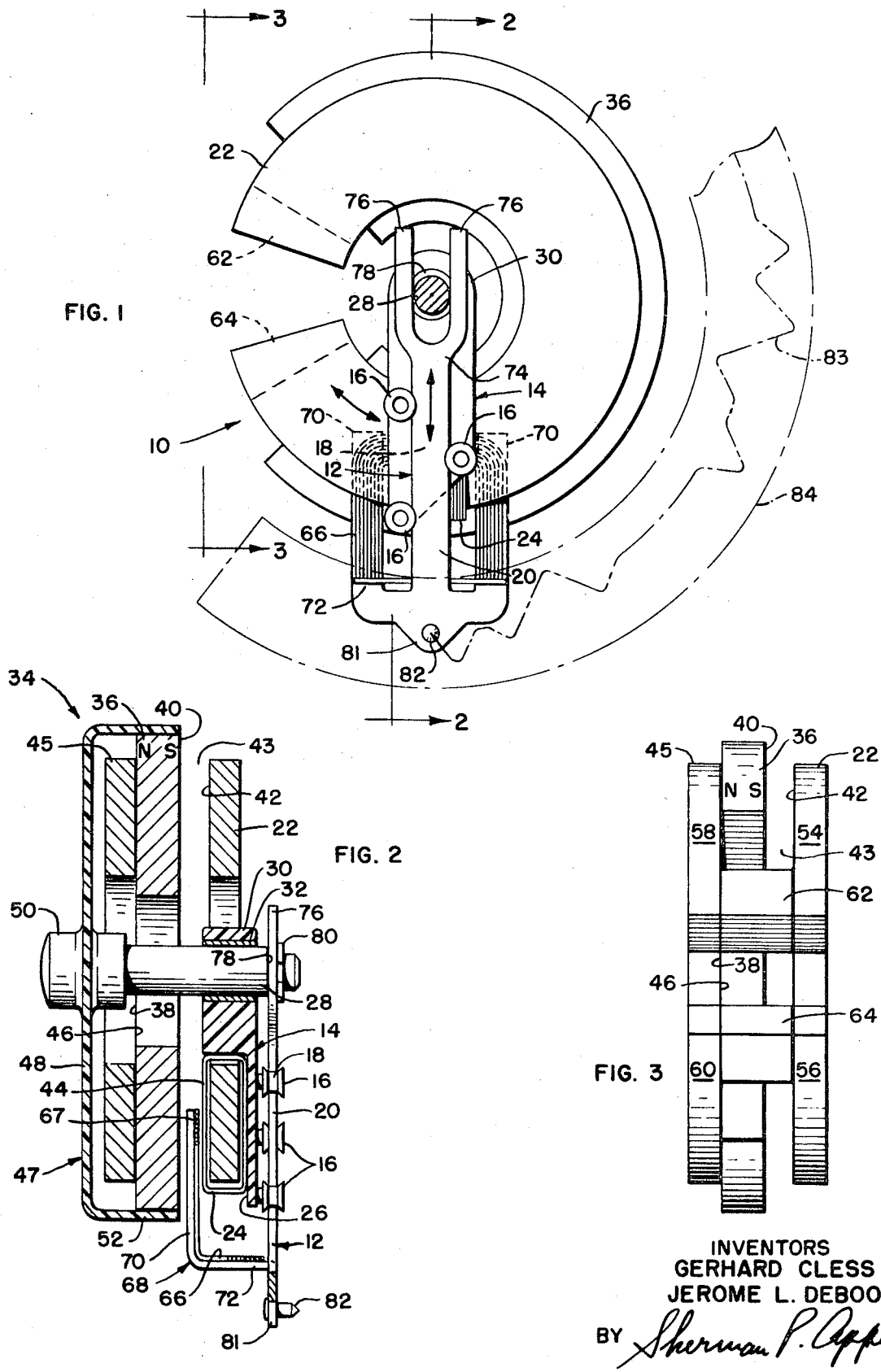
PATENTED FEB 8 1972
3,641,583
SHEET 1 OF 2
INVENTORS
GERHARD CLESS
JEROME L. DEBOO
BY Sherman P. Appel
ATTORNEY 3,641,583

ELECTRODYNAMIC TRANSDUCER

FIELD OF THE INVENTION

The present invention relates to transducers. Particularly it relates to an electrodynamic transducer.

BACKGROUND OF THE INVENTION

A transducer of the indicated class is useful as a motor in a positioning device or a plural axis plotter, because of its rapidity of responsiveness to mechanical input forces and the high level of resolution which it enables to achieve. A pair of contemporaneously filed applications of Gerhard Cless, (an inventor herein) and Allan G. Wallskog and which are assigned to assignee of the present application and are identified further as follows: (1) Ser. No. 41,485, titled PRINTING ASSEMBLIES AND METHODS, and (2) Ser. No. 41,335, titled PRINTER TYPE CARRIER ASSEMBLY, describe and claim transducers of the indicated class and disclose embodiments of such transducers as positioning devices in teleprinters.

Moreover, such construction could be adapted as a generator for producing plural electrical outputs each corresponding to the velocity relative an axial component of a vector along which an input member is moved.

It is an object of the present invention to provide a novel transducer.

It is another object of the invention that the transducer be electrodynamic.

It is an additional object of the invention to move a body along any vector having plural axial components, particularly in response to plural input forces corresponding to said axial components.

It is a still further object of the invention to provide a novel motor.

It is a yet further object of the invention to provide a plural axes plotter.

Further, it is an object of the invention to provide a novel generator.

Moreover, it is an object of the invention to produce a plurality of outputs corresponding to the velocity relative axial coordinates of a movement vector of an input member.

SUMMARY OF THE INVENTION

The foregoing and other objects of the invention are effected according to one aspect of the invention by a transducer comprised of an assembly arranged for relative and simultaneous movement in transversely extending paths, and electrodynamic means and mechanical means associated in input-output relationship with said assembly for translating power in one form to power in another.

From another aspect, the objects of the invention are effected by providing, as electrodynamic means, a rail defining a magnetic circuit and a pair of electrical inductance coils coupled in the flux field of said magnetic circuit. Each coil is connected to one of a pair of mechanically coupled members comprising the assembly. One of said coils is disposed about said rail for movement longitudinally thereof to move both members along one axis; and one of said members is reciprocative relative the other thereof.

By adapting an input/output element which is carried from the reciprocative member as an inscriber, the transducer is adapted as a dual axes plotter. By adapting said element for input, a pair of outputs will be generated in said coils corresponding to the velocity relative the coordinate axes of a vector along which the input element is moving.

BRIEF DESCRIPTION OF THE DRAWINGS

In the ensuing detailed description of the invention, reference is had to the accompanying drawings in which:

FIG. 1 is an elevational view of a dual axes plotter embodying the invention, a center shaft shown in section, and a fragment of an associated record carrier shown in phantom;

FIG. 2 is a view according to section line 2—2 of FIG. 1;

FIG. 3 is a detailed view according to the line 3—3 of FIG. 1, a hanger having been omitted;

DETAILED DESCRIPTION OF THE INVENTION

Figure 4:
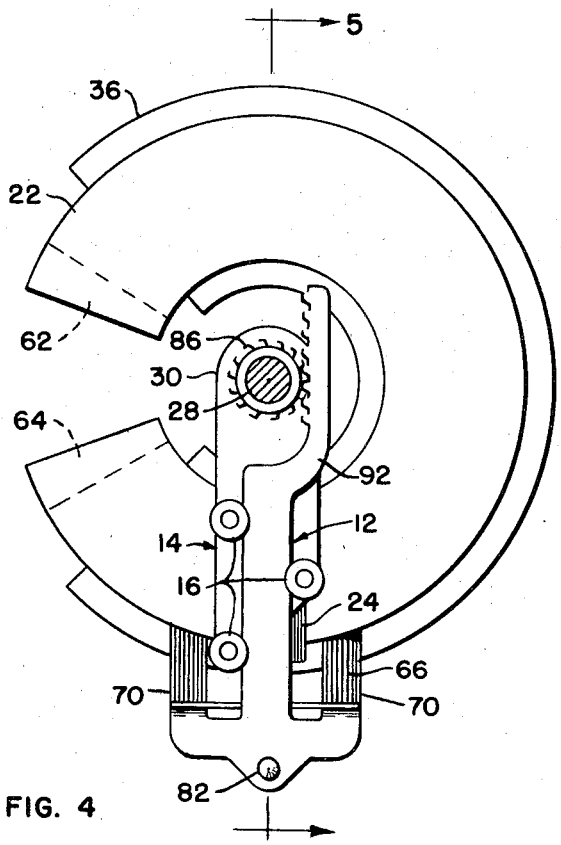
FIG. 4 is a view similar to FIG. 1, however, showing a motor embodying a modified form of the invention.

Referring now more particularly to FIG. 1, shown is a transducer generally designated 10 which may be adapted as a motor or a generator. The transducer comprises an input/output assembly arranged for relative and simultaneous movement in transversely extending paths and comprising a first member 12 and a second member 14. The first member is an arm which is mounted for reciprocation in a lineal path longitudinally thereof and relative the second member. The first member is carried from the second member which is also mounted for movement in a lineal path, but transversely of the direction of reciprocation.

Coupling means for simultaneously moving first and second members 12 and 14 and enabling relative movement thereof comprises a plurality of roller-type bearings 16 which are secured from the second member to provide a straight track 18 (FIG. 1). An elongated body portion 20 of first member 12 is engaged in track 18 for reciprocating said first member relative second member 14.

A rail 22 defines a lineal path which second member 14 is movable longitudinally. To effect such movement, an electrical inductance coil 24 is wound in a plane perpendicular to and is circumposed about said rail and has a section 26 (FIGS. 2 and 5) which is rigidly secured to a proximate part of second member 14. The coil is supported for movement longitudinally of said rail whereby the second member and the coil move together, and as will be apparent from ensuing description, in response to an electrical effect through said coil when the transducer is adapted as a motor.

In the illustrated embodiment, rail 22 is arcuate being concentric with and disposed about an axis defined by a shaft 28. The latter comprises means for supporting transducer 10 such that the aspect of track 18 is radial to said shaft and orthogonal to the path along which second member 14 is displaceable. To provide the support, the second member has a central extension 30 with a bearing-lined aperture 32 enabling angular movement of the second member about shaft 28.

Rail 22 is a pole piece, being fabricated from soft iron or the like. It is of low magnetic reluctance and low magnetic retentivity in a permanent magnet assembly or structure generally designated 34 and comprising electrodynamic means. Also included in the magnetic assembly is a permanent magnet 36 having an arcuate configuration concentric with shaft 28. The permanent magnet is polarized through its thickness with opposed North and South poles (conventionally designed N and S in FIGS. 2 and 3) being disposed on opposed parallel flat faces 38 and 40 thereof. Polar face 40 is also spaced from a thereto parallel flat face 42 of rail 22, the spacing therebetween forming an airgap 43 to the magnetic flux in which one section 44 of coil 24 is magnetically coupled. A pole piece 45 similar in fabrication and configuration to rail 22 and concentric with shaft 28 has a flat face 46 which is suitably rigidly secured, by a suitable cementing or the like, to face 38 of the permanent magnet.

A preferably nonmagnetic housing or hanger 47 (FIG. 2) comprises a flat plate 48 which is disposed parallel to pole piece 45. It has a central box 50 in which one end of shaft 28 is supported. In the embodiment of the invention of FIG. 2, the shaft is immobilized relative the hanger, but this feature is not critical to the invention. Peripheral flange means 52 integral with plate 48 is rigidly secured to the periphery of magnet 36 whereby magnet structure 34 is hung or supported from shaft 28.

In each illustrated embodiment pole piece 22 has a pair of opposite ends 54 and 56 (FIG. 3) and pole piece 45 has a pair of opposite ends 58 and 60. Ends 54 and 58 are aligned at one end portion of magnet structure 34 and are magnetically interconnected by soft iron piece 62. Ends 56 and 60 are aligned at the other end portion of the magnet structure and are magnetically interconnected by a soft iron piece 64. Thereby, pieces 62 and 64 are spaced apart ends of the magnet structure and complete an elongated physical loop and a magnetic circuit defining therewithin air gap 43. In this loop, rail 22 and pole piece 45 are elongated parallel sections of opposite polarity. Permanent magnet 36 is disposed inside the loop. Members 12 and 14 are disposed outside the loop.

An electrical inductance coil 66 is included in the electrodynamic means and has a magnetically coupled portion 67 which cuts the magnetic lines of flux in airgap 43 for reciprocation in a path extending normally to the path of movement of coil 24. The coupled portion is slightly spaced from section 44 of coil 24 and defines a plane which is orthogonal to a plane defined by coil 24. A rigid linkage designated 68 comprises a pair of spaced-apart arms 70 from which coil 66 is rigidly supported in the airgap. A connecting component 72 integral with arms 70 is rigidly connected to first member 12 for reciprocating said last-mentioned member in response to an electrical effect through coil 66 when the transducer is adapted as a motor.

The arrangement and disposition of coils 24 and 66 is such that magnetic lines of flux flowing in the magnetic circuit defined by magnetic construction 34 are effectively cut at right angles most efficiently to move the members 12 and 14 in response to current flow in the coils when the transducer is adapted as a motor. In this connection, it is observed that when current flows in one direction through any coil, movement of an associated of members 12 and 14 will result in a corresponding direction, whereas, current flow in an opposite direction in such coil will result in movement of such member in an opposite direction. Accordingly, each time coil 24 moves magnetomotively, members 12 and 14 will move simultaneously, whereas, only member 12 is responsive to magnetomotive reciprocation of coil 66. Furthermore, the arrangement of parts in the illustrated embodiments is such that reciprocative movement is radial i.e., along an $r$ axis of a two-axis system, whereas movement of member 14 is concentric to shaft 28, i.e., along a $\theta$ axis of such two-axis system.

To prevent interference of shaft 28 with the radial movement in the embodiment of FIG. 1, first member 12 has a central extension 74 comprised of a pair of tines 76. They are disposed on opposite sides of said shaft 28 and are engaged for reciprocation in an annular groove formed between an annular shaft shoulder 78 and a retainer 80 suitably held on the reduced end portion of the shaft.

First member 12 has an outer end portion 81 in which is secured an element 82. The latter is an input component when the transducer is adapted as a generator. It is an output component when the transducer is adapted as a motor.

Herein, the transducer is shown as a motor, particularly a dual ($r-\theta$) axes plotter; and element 82 is an inscriber. It is adapted to apply a trace 83 longitudinally of an arcuately disposed carrier 84 about the axis of shaft 28 and according to the current through coils 24 and 66.

It is observed that in some aspects the invention herein embodied is not limited to the arcuate configuration of rail 22. That is to say, said rail could be straightened with attendant modification in the support means for second member 14 to enable tracking of such straightened rail. Thereby, an illustrated device could be converted to an X-Y plotter in which the output element would then be movable along a vector having straight normal planar coordinates.

Figure 5:
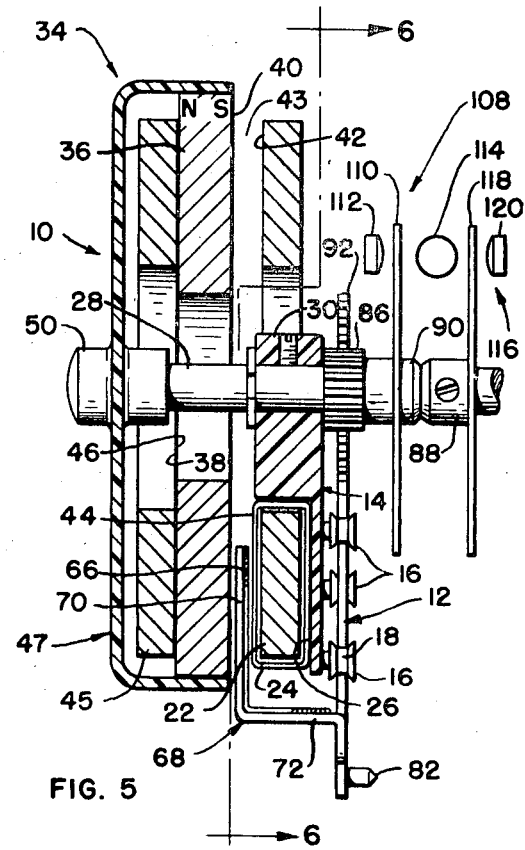
FIG. 5 is a view according to line 5—5 on FIG. 4.
Figure 6:
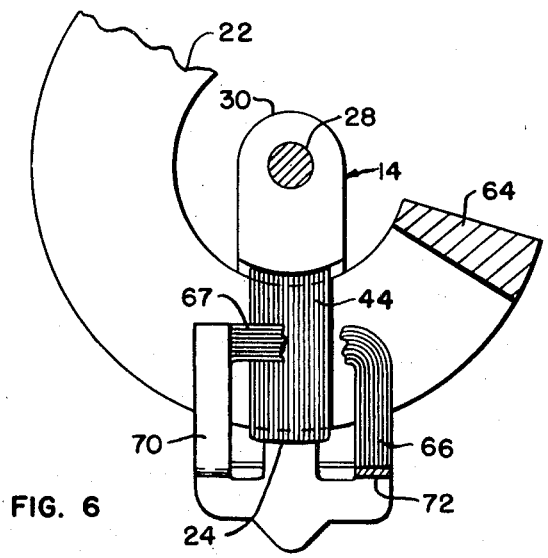
FIG. 6 is a view according to line 6—6 on FIG. 5.

In the embodiment of the invention shown in FIGS. 4 and 5, transducer 10 incorporates feedback means as part of a servo circuit 85 (FIG. 7) for controlling element 82. In said modified embodiment shaft 28 is journaled for rotation in box 50 and second member 14 is rigidly secured to the shaft. Thereby upon translocation of coil 24 longitudinally of rail 22, the shaft will move angularly.

A pinion 86 is journaled on shaft 28 distally from box 50. It is retained from displacement axially of said shaft by bearing engagement with extension 30 of member 14 on one side thereof and with a retainer 88 which bears against the pinion hub 90 on the other side thereof. An inner extension 92 (FIG. 4) of first member 12 in this embodiment replaces extension 74 of the first described embodiment and is fashioned as a gear rack. It is operatively meshed with the pinion, whereby, said pinion has an angular condition corresponding to each radial position of the first member.

Figure 7:
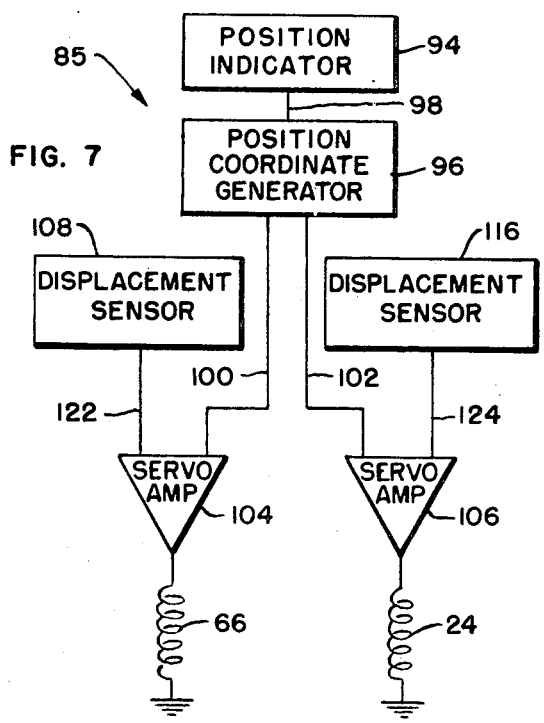
FIG. 7 is a wiring scheme adapted for controlling the modified form.

According to the exemplary scheme, selection of the position to which it is desired to move element 82 is effected electrically through a position indicator 94 (FIG. 7). The output thereof is a composite signal which is impressed upon a position coordinate generator 96 through a conductive lead 98. There the input is divided into a pair of coordinate signals which correspond to the positions to which it is desired to drive the coils 24 and 66, respectively, and such coordinate signals are provided as inputs through a pair of conductors 100 and 102 to a pair of servoamplifiers 104 and 106 associated, respectively, with inductance coils 66 and 24.

Displacement sensor means 108 for indicating each position of first member 12 in a radial path comprises a disc 110 which is mounted for rotation with pinion hub 90 and has a plurality of apertures (not shown) arranged annularly and radially according to a code such that an encoded combination will occupy a fixed illuminating station for each angular condition of pinion 86. A photosensor 112 is supported in a position adjacent one face of the disc such that it will be impinged by rays of light passed from a light source 114 through the apertures of disc 110 occupying the illuminating station. The light source is also fixed from angular movement and arranged adjacent an opposed face of the disc and in consequence, for each angular position of the pinion, the sensor will be encodedly excited correspondingly.

A similar displacement sensor 116 comprises a light-encoding disc 118 which is mounted parallel to disc 110 for rotation with shaft 28. It has encoding apertures (not shown) and opposed faces adjacent which light source 114 and a fixed photosensor 120 are mounted in alignment such that a light code will be impressed on the last photosensor corresponding to each condition of the shaft.

The signal generated by each photosensor will be transmitted through a respective one of leads 122 and 124 to a corresponding one of servoamplifiers 104 and 106 as an input. There it will be algebraically added, in a manner which is well known in the art with the input received through an associated one of conductors 100 and 122 to produce a resulting amplifier output signal to an associated one of inductance coils 24 and 66 for driving element 82 from any given position to any other selected position.

When transducer 10 is adapted as a generator, element 82 will be an input component and inductance coils 24 and 66 become output elements. It is appreciated that then a voltage would generate in either or both of the coils depending upon the velocity relative the axes of the vector along which element 82 is moving. For example, a mechanical input force resulting in movement of element 82 only radially will generate an output effect only in inductance coil 66. On the other hand, if the input force is a torque concentric with shaft 28, an induced voltage will be generated only in the coil 24. However, when movement of element 82 is along a vector comprised of both axial components, then a pair of induced effects will be generated in the coils as a function of the velocity relative the coordinates of said vector.

As many modifications in the described construction could be conceived, and as many changes could be made therein without departing from the spirit and scope of the claims, it is intended that all matter contained in the accompanying specification shall be considered as illustrative only and not in a limiting sense.

We claim:

1. A transducer comprising:
a first member mounted for reciprocation;
a second member mounted for movement in a lineal path transversely of the direction of reciprocation;
coupling means for simultaneously moving said first and second members in said lineal path;
an arcuate rail defining said lineal path, said second member associated with said arcuate rail for movement angularly about a center;
a magnetic structure including said rail and defining an air gap with a magnetic flux field therein;
first and second electrical inductance coils rigidly connected to said first and second members, respectively, and disposed in a pair of spaced apart planes in magnetically coupleable association in said air gap for movement with said first and second members; and
a writing component carried from said first member and translocatable in response to electrical effects in said first and second inductance coils.

2. A transducer comprising:
a first member mounted for reciprocation;
a second member mounted for movement in a lineal path transversely of the direction of reciprocation;
coupling means for simultaneously moving said first and second members in said lineal path;
an arcuate rail defining said lineal path, said second member associated with said arcuate rail for movement angularly about a center;
a pair of elongated magnet sections including said rail and of magnetic material, said sections defining an airgap therebetween;
a first inductance coil rigidly connected to said first member and arranged for reciprocation in said airgap in a direction transverse to said sections;
a second inductance coil rigidly connected to said second member and circumposed about one of said sections for movement longitudinally thereof, and
an input element carried from said first member for generating electrical output effects in said first and second inductance coils along and jointly.

3. A transducer comprising:
a magnetic structure comprised of a rail and having an airgap with a magnetic flux field;
first and second inductance coils magnetically coupled and arranged for movement in said magnetic flux field along a pair of angularly associated axes of a two axes system, said second coil mounted about said rail and disposed in a plane extending transversely of said rail for movement along one of said axes, said first coil supported in a plane and spaced in said gap from said second coil for reciprocation relative said second coil;
a shaft, said rail supported concentrically from said shaft, said second member having an extension mounted from said shaft for moving said second coil along said rail in an arcuate path about said shaft;
means for changing the position of said coils simultaneously and alone, each relative to the other; and
an element connected to said changing means and arranged for movement along any selected vector in said system to any selected position.

4. A transducer according to claim 3 characterized by rotational means associated with said shaft having an angular position associated with each position of reciprocation of said first coil relative said second coil, and feedback means associated with said shaft and said rotational means for generating signals corresponding to the positions of said coils.

5. A transducer according to claim 4 wherein said rotational means comprised a pinion mounted about said shaft, and a gear driveably connected to said first coil for rotating said pinion about said shaft.

6. A generator comprising:
a first input member;
a second input member;
means for moving said input members simultaneously in one path and for reciprocating said first member on said second member in another path at any selected position in said one path;
a first electrical inductance coil mechanically secured to said first member;
a second electrical inductance coil mechanically secured to said second member; and
a loop of magnetic material having opposed polar sections with an arcuate profile and defining therewithin a magnetic gap, the second coil circumposed about one of said polar sections, the first coil movable in an arcuate path with said second coil and magnetically coupled on said magnetic gap for reciprocative movement independently thereof.

7. A generator according to claim 6 characterized by a permanent magnet secured to the other of said polar sections for generating a flux field in said magnetic gap, and an input element connected to said members and arranged for movement directly to any position in a two axes system, said first and second coils being disposed in said gap in planes having aspects, each normal to the other, whereupon movement of said element along a vector having a pair of axial components to any position an effect will be generated in said coils.

8. A generator according to claim 7 wherein said coils are movable in intersecting paths corresponding to the pair of axes in said two axes system, the effect generated in each coil being responsive to the velocity relating to each axial component of a vector as said element moves to any position.

9. In an electrodynamic-mechanical transducer of the type having a pair of mechanical members coupled together for translocation simultaneously in a curvilinear path and for reciprocation of one member independently of the other member, and wherein translocation of both members is in association with one of a pair of inductance coils arranged for movement in a curvilinear path transversely of the path of movement of another of said pair of coils associated with said reciprocation, the improvement characterized by:
a single magnetic flux field, both of said coils being disposed in said single magnetic flux field for generating a pair of effects.

10. A combination according to claim 9 characterized by a pair of concentric members arranged for rotation in response to said translocation and said reciprocation, and feedback means associated with said concentric members for providing intelligence as to the instantaneous conditions of translocation and reciprocation.

* * * * *